Figure 1:
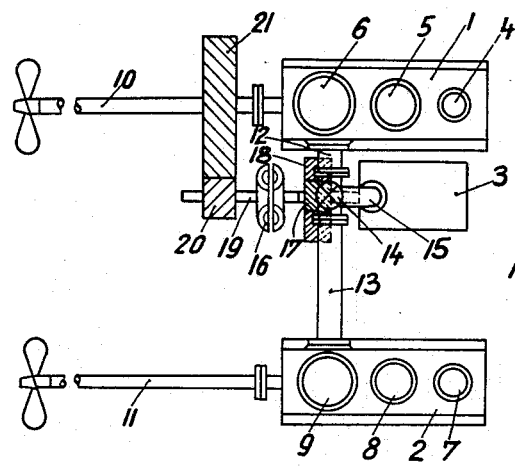

Oct. 31, 1933.    G. BAUER    1,933,041

SHIP'S ENGINE PLANT

Filed Jan. 10, 1930

Gustav Bauer,
Inventor by
Attorney.

Patented Oct. 31, 1933

1,933,041

UNITED STATES PATENT OFFICE 1,933,041

SHIP'S ENGINE PLANT

Gustav Bauer, Hamburg, Germany

Application January 10, 1930, Serial No. 419,913, and in Germany January 10, 1929

1 Claim. (Cl. 60—21)

This invention relates to ship's engine plants, and more particularly to plants of this kind which comprise two or more propeller shafts of which each is driven either directly or by means of intermediate gear wheels from a reciprocating steam engine, the reciprocating engines being associated each with an exhaust turbine which serves for more advantageously utilizing the steam energy.

Essentially my present invention consists in providing a single exhaust turbine in conjunction with all of the reciprocating steam engines employed, said exhaust turbine being in driving connection with only one of the several propeller shafts. Preferably in ship's engine plants constructed according to my present invention the power of the several engines is so distributed with respect to the propeller shafts, that is to say the power of the individual reciprocating steam engines is so chosen that each of the several propeller shafts will perform the same amount of work. More especially, according to my present invention this is accomplished by arranging the reciprocating steam engines and the exhaust turbine as well as the propeller shafts in such a manner with respect to each other that the power which is transmitted by one reciprocating engine and the exhaust turbine to one propeller shaft will be equal or approximately equal to the power of the reciprocating engine which is transmitted to the other propeller shaft or shafts.

In case of plants comprising reciprocating engines together with exhaust turbines which had subsequently been installed with engines of equal size, the power of the plant may be increased and the efficiency improved in accordance with the present invention, by decreasing the size or power of the engine which cooperates with the exhaust turbine and increasing the size or power of the engine operating alone. The uniformity of distribution of power with respect to the propeller shafts is obtained by increasing the power of one engine or by decreasing the power of the other, or by both changes.

This may be attained, for instance, by decreasing the diameter of the high-pressure cylinder of the engine which works continuously in conjunction with the exhaust turbine upon the same propeller shaft. This decrease of diameter may, for instance, be accomplished by inserting a bushing or the like into the high-pressure cylinder of the respective engine. Increasing the diameter of the high-pressure cylinder of the other engine may be accomplished by boring or reaming. A further possibility of attaining the aforementioned increase of the power of the several engines consists therein that both high-pressure cylinders are properly changed by increasing or decreasing their diameters.

In addition to the foregoing, the arrangement may also be made in such a manner that all or only individual cylinders, viz: the high-pressure, medium-pressure and low-pressure cylinder of that engine which co-operates with the exhaust turbine are increased in diameter, while the respective cylinders of the other engine are increased in diameter. According to my invention, there will further be the possibility of decreasing one or more cylinders of one engine and simultaneously therewith increasing the respective cylinders of another engine.

Figure 2:
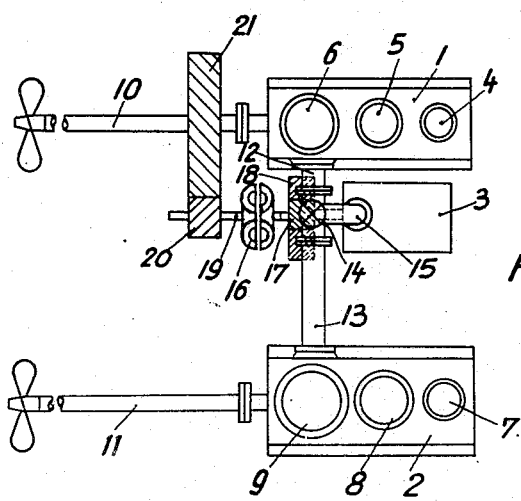

In the accompanying drawing I have shown two examples of plants constructed according to my present invention for a ship having two propeller shafts, Fig. 1 being a diagrammatic top view of one form of plant and Fig. 2 a similar top view of the other form of plant.

In the drawing, the reciprocating steam engine 1 having a high-pressure cylinder 4, a medium-pressure cylinder 5 and a low-pressure cylinder 6 is directly coupled to the propeller shaft 10 and in like manner the reciprocating steam engine 2 having a high-pressure cylinder 7, a medium-pressure cylinder 8 and a low-pressure cylinder 9 is directly coupled to the propeller shaft 11. The exhaust steam of both reciprocating engines 1 and 2 now, is utilized in an exhaust turbine 3; more particularly, said exhaust turbine 3 is connected to said reciprocating engines 1 and 2 in such a manner that the exhaust steam from the low-pressure cylinder 6 of the engine 1 is conveyed through the pipe 12 and the exhaust steam from the low-pressure cylinder 9 of the engine 2 through the pipe 13 to the change-over valve 14, whence the exhaust steam is further carried through the pipe 15 into the exhaust turbine 3.

After having passed through the exhaust turbine 3, the steam enters the usual condenser (not shown). The exhaust turbine 3 is coupled with the propeller shaft 10 by way of the shaft 19, the pinion 20 carried thereon and the gearwheel 21 which is mounted upon said propeller shaft 10 in mesh with said pinion 20. The intermediary shaft 19 may be equipped with any kind of yielding coupling, for instance, with a liquid coupling of the type shown in the Föttinger Patent 1,199,359, issued Sept. 26, 1916, as indicated at 16 in the drawing, said liquid coupling being preferably capable of being emptied or filled with liquid at will and thus serving for putting the exhaust turbine either into or out of operation and for preventing transmission of shocks or oscillations from the reciprocating engine to the turbine or vice versa.

Between the hydraulic coupling and the exhaust turbine, there may be employed a reduction gearing including a pinion 17 on the exhaust turbine shaft, and a gear 18 meshing with said pinion and serving to drive the rotor of said hydraulic coupling.

In the construction of the ship's plant shown in Fig. 1 including an exhaust turbine 3 which in order to increase the efficiency of the plant has been subsequently built-in, the high-pressure cylinder 4 of the engine 1 is decreased in diameter which may, for instance, be accomplished by inserting a proper bushing into said cylinder, thus correspondingly decreasing the power of the engine 1. The decrease of the power of said engine 1 should be of such dimension that the power, which is transmitted from this engine and the exhaust turbine 3 to the propeller shaft 10 will be equal to the power which is transmitted from the engine 2 to the propeller shaft 11.

In the ship's engine plant shown in Fig. 2 the diameters of the cylinders of the reciprocating engine 2 have been increased for the purpose of more fully utilizing the power of the exhaust turbine with a view of increasing the total power produced by the plant with even consumption of steam. In the same manner in the construction according to Fig. 2 the power of the engine 2 has likewise been increased to such an extent that the power transmitted from this engine to the propeller shaft 11 will be equal to the power of the engine 1 augmented by the power of the exhaust turbine 3.

While I have shown herein and particularly described a ship's engine plant having a specific arrangement of reciprocating steam engines and turbines in the exhaust thereof for an engine plant comprising two propeller shafts, I desire of being understood that the herein described principles may likewise be used with advantage in connection with a ship's engine plant comprising three or more propeller shafts. The arrangement of the engines, the turbine and the propeller shafts in case of a plant with three propeller shafts will be exactly in agreement with the two examples shown and described herein for a two propeller plant.

I claim:

An engine plant for the propulsion of ships, including a pair of multi-cylinder reciprocating steam engines, the diameter of one or more of the cylinders of one engine being smaller than the diameter of the corresponding cylinder or cylinders of the other engine, whereby the power of the last mentioned engine is in excess of that of the first mentioned engine, a pair of propeller shafts free for independent rotation, each propeller shaft being connected to and driven by its corresponding engine, a single exhaust turbine connected to receive exhaust steam from both of said engines and deliver power substantially equal to the difference between the powers of said reciprocating steam engines, and a driving connection including speed reducing gearing between said turbine and the shaft of only the reciprocating engine having the smaller power, whereby the power of said last mentioned engine and the power of said turbine delivered to one propeller shaft is substantially equal to the power transmitted from the other engine to the other propeller shaft.

GUSTAV BAUER.